E. T. SILVIUS.
TRANSMISSION AND CONTROLLING GEARING.
APPLICATION FILED NOV. 10, 1917.

1,360,693.

Patented Nov. 30, 1920.
4 SHEETS—SHEET 1.

WITNESSES:
J. H. Gardner.
L. A. Waskom.

INVENTOR:
Ellis T. Silvius.

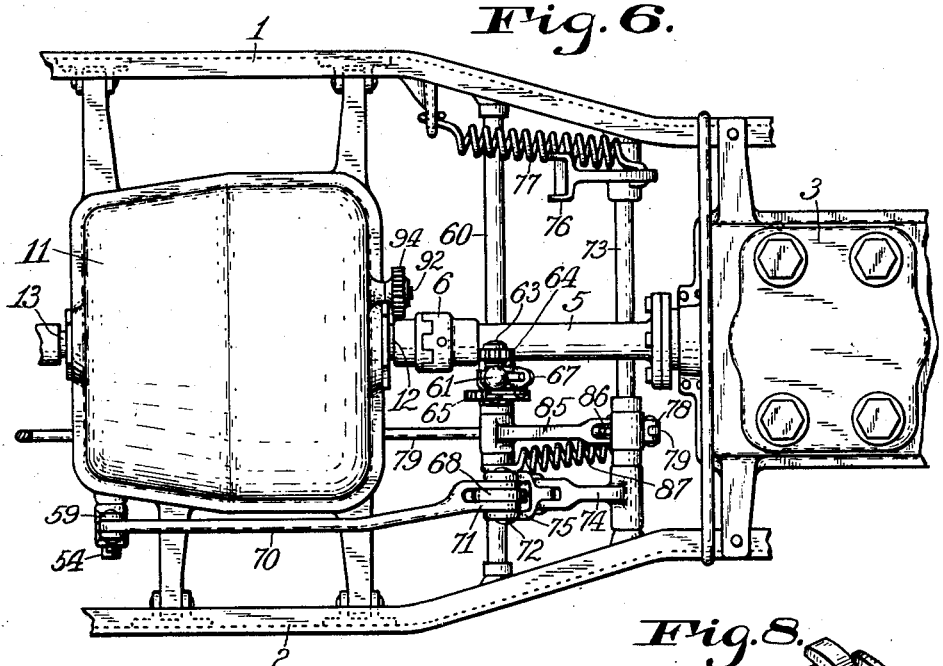
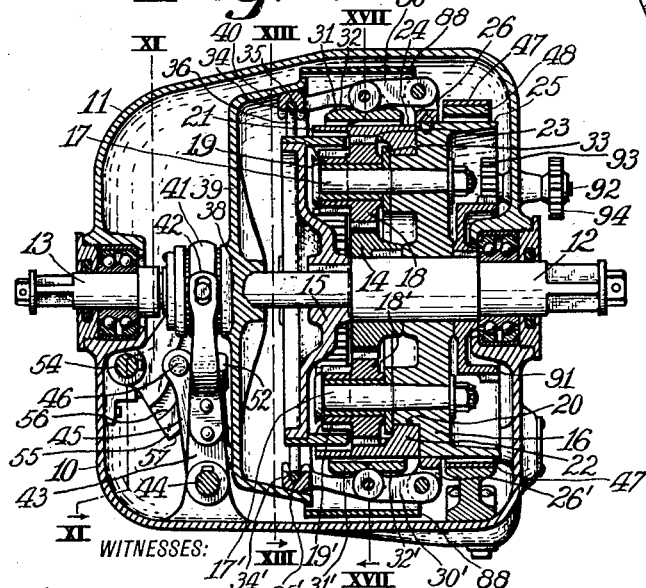
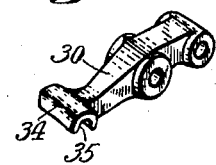

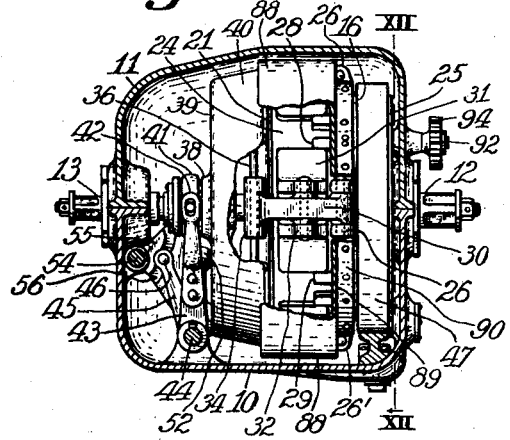
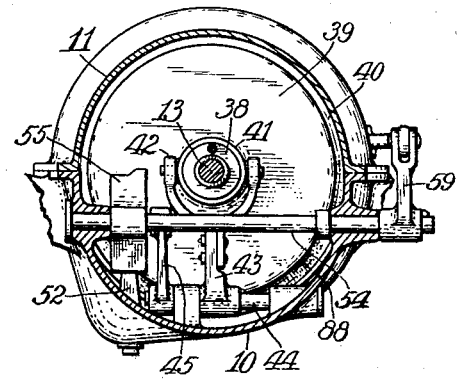
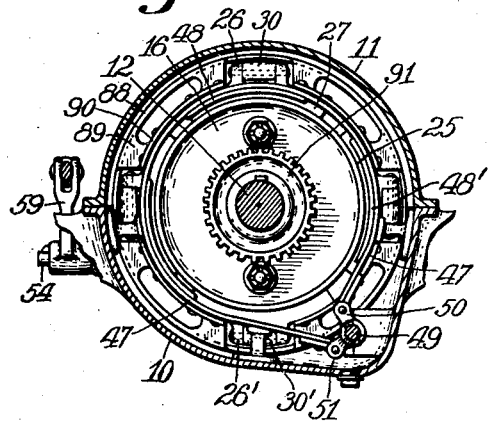
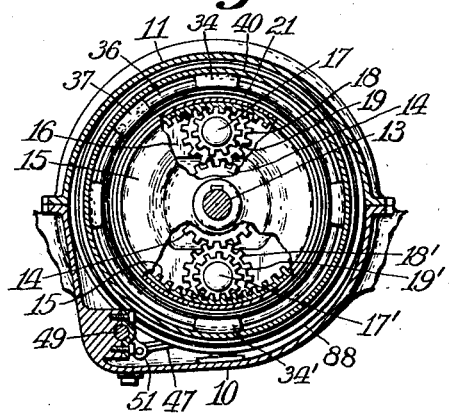
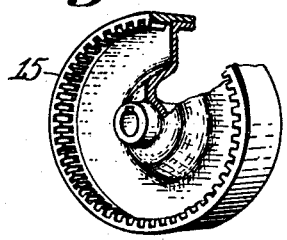
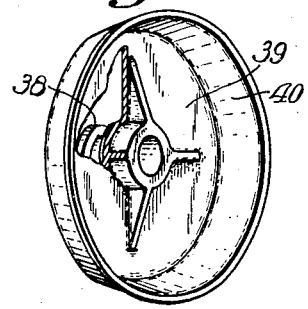

E. T. SILVIUS.
TRANSMISSION AND CONTROLLING GEARING.
APPLICATION FILED NOV. 10, 1917.

1,360,693.

Patented Nov. 30, 1920.
4 SHEETS—SHEET 4.

WITNESSES:
J. H. Gardner
J. A. Waskom

INVENTOR:
Ellis T. Silvius

UNITED STATES PATENT OFFICE.

ELLIS T. SILVIUS, OF INDIANAPOLIS, INDIANA.

TRANSMISSION AND CONTROLLING GEARING.

1,360,693.

Specification of Letters Patent.

Patented Nov. 30, 1920.

Application filed November 10, 1917. Serial No. 201,228.

*To all whom it may concern:*

Be it known that I, ELLIS T. SILVIUS, a citizen of the United States, residing at Indianapolis, in the county of Marion and State of Indiana, have invented a new and useful Improvement in Transmission and Controlling Gearing, of which the following is a specification, reference being had to the accompanying drawings and to the letters and figures of reference marked thereon.

This invention relates to transmission gearing or mechanism of the type that is capable of reversibly transmitting power motion from a rotary driving shaft to a rotary driven shaft, as from the crank shaft of an explosion engine to the propeller shaft of an automobile, motor truck or motor boat, and at gradually varying speed relatively to the driving or crank shaft, the invention having reference more particularly to transmission mechanism of the above-mentioned character which includes toothed gear wheels that are constantly in engagement to constitute a continuous train of wheels from the driving shaft to the driven shaft; and, the invention relates also to controlling means for the transmission gearing or mechanism. The invention relates also further to improvements in and modifications of the transmission and controlling gearing described in my prior application for Letters Patent filed February 14, 1916, Serial Number 78,251, the present application for Letters Patent being a continuation of said prior application in so far as the subject-matter is common to both applications.

An object of the invention is to provide a powerful reversing transmission mechanism of the gradual-change type, and improved controlling means therefor to be controlled by a single primary controller, for insuring gradual but prompt changes of speed and reversing of direction of transmitted motion, quietly and without risk of injury to the mechanism.

Another object is to provide a secondary control for reversing variable-speed gearing of the above-mentioned character, to permit temporary reduction of speed or stopping of the propeller shaft while the driving shaft continues at full speed, without altering the set position of the primary controller comprised in the controlling means, more especially when the transmission gearing is set for forward motion operation.

Another object is to provide a reversing transmission gearing having improved gears and compact arrangement thereof which shall be simple and efficient in operation, and particularly to provide improved means for gradually retarding or stopping rotation of certain of the gears to effect transmission of motion and changes of transmitted speed, and without causing shocks or jarring in operation.

Another object is to provide improved means whereby to enable an operator by means of a single primary controller to simply control forward-motion and reverse-motion controlling means of gradual-change reversing and speed-changing transmission gearing or mechanism, and further to provide an improved primary controller and appurtenances thereof.

A further object is to provide improved means for automatically controlling a brake, by means of a primary controller of a transmission mechanism of the above-mentioned character, to fully or partially apply the brake when the propeller shaft is disconnected from the driving shaft, or to release the brake to permit operation of the propeller shaft.

A still further object is to provide improved reversing transmission gearing of the gradual-change type which may be constructed of simple and inexpensive forms of gears and appliances, and which shall be so constructed as to permit improved controlling means to be applied thereto.

With the above-mentioned and other objects in view, the invention consists in improved gears and in a novel arrangement thereof, in novel means for effecting useful operation and control of the gears, in improved means for graduating the operation of the gears, and in an improved brake controller, in reversing speed-changing and controlling gearing; and, the invention consists also further in the novel parts or features, and in the combinations and arrangements thereof, as hereinafter particularly described and further defined in the appended claims.

Referring to the drawings for a full and clear understanding of the invention—

Fig. 6 is a fragmentary top plan of the automobile and the improved gear set.

Fig. 7 is a vertical central section of the improved transmission gearing and its gear case on the line VII—VII on Fig. 3.

Fig. 8 is a perspective view of an improved form of shifting-link or device pertaining to the prime controller provided for operatively connecting the forward motion control device and the reverse motion control device together for rapidly and smoothly changing the speed and reversing the direction of motion of the driven element or propeller shaft relatively to the driving shaft.

Fig. 9 is a perspective view of one of the improved levers comprised in the improved speed changing mechanism.

Fig. 10 is a vertical central section of the gear case and the transmission gearing in elevation and partially broken away.

Fig. 11 is a fragmentary sectional elevation approximately on the line XI—XI on Fig. 7.

Fig. 12 is a sectional elevation approximately on the line XII—XII on Fig. 10.

Fig. 13 is a sectional elevation approximately on the line XIII—XIII on Fig. 7, portions being broken away.

Fig. 14 is a perspective view of the improved driven gear wheel as preferably constructed, the wheel being partially broken away to show a portion thereof in cross section.

Fig. 15 is a perspective view of an improved adjuster-head comprised in the gearing.

Fig. 16 is a perspective view of associated elements whereby to make operative connection between the forward motion control and the shifting link or device.

On the various figures of the drawings, similar reference characters indicate corresponding parts or features of construction throughout the different views and herein referred to in detail.

Figure 1:
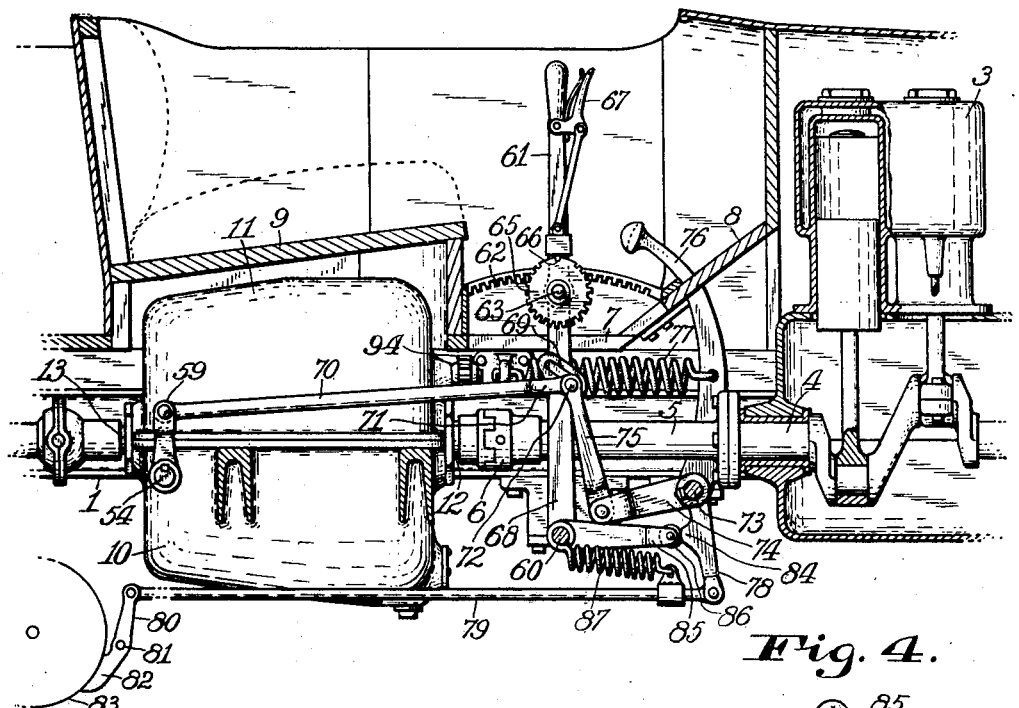
Figure 1 is a fragmentary longitudinal central section of an automobile and the improved transmission and controlling gearing represented in side elevation in connection therewith.
Figures 2, 3, 4, 5:
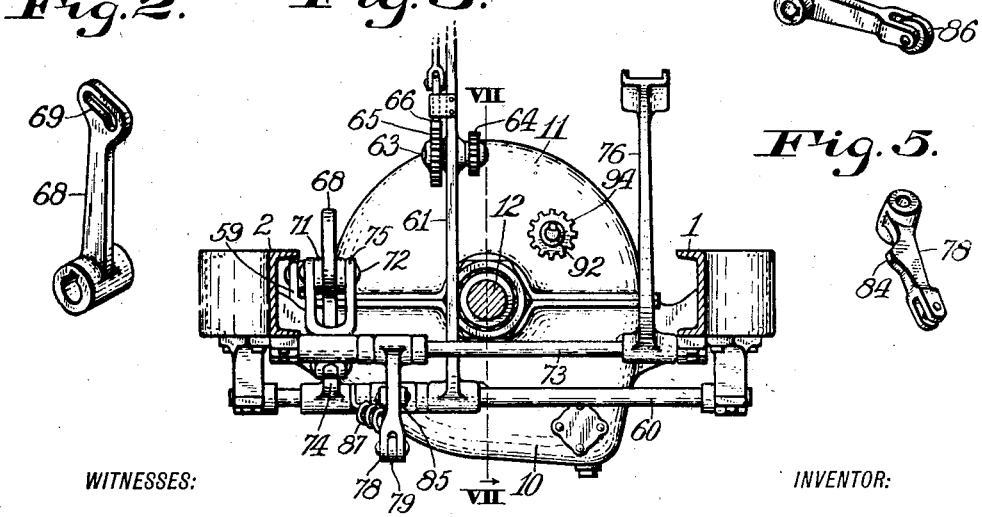
Fig. 2 is a perspective view of a device which is preferably comprised in means whereby to disconnect the propeller shaft from the driving shaft without changing the position of the graduating primary controller.
Fig. 3 is a fragmentary transverse section of the automobile and a front elevation of the improved gear mounting.
Fig. 4 is a perspective view of one of the elements of the improved brake controlling means as preferably constructed.
Fig. 5 is a perspective view of another one of the elements of the improved brake controller illustrated.
Figure 17:
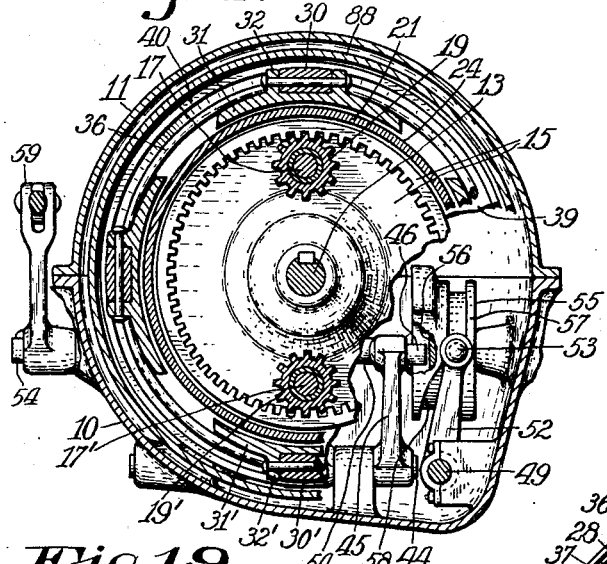
Fig. 17 is a sectional elevation, in which parts are broken away, approximately on the line XVII—XVII on Fig. 7.
Figure 18:
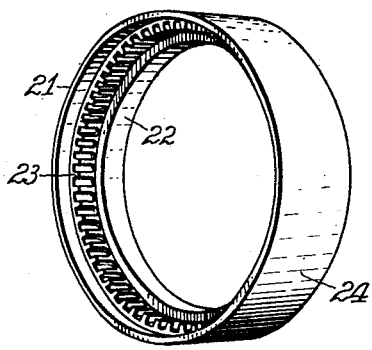
Fig. 18 is a perspective view of a novel gear-controlling device constituting a part of the improved gearing.
Figures 19, 20:
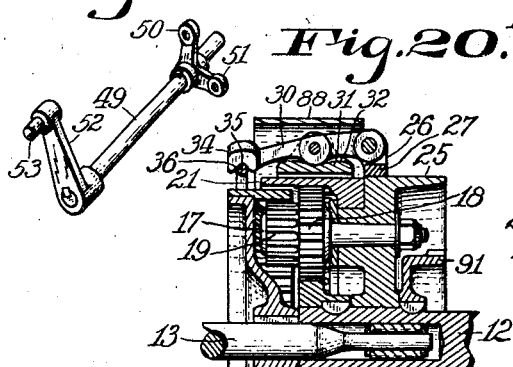
Fig. 19 is a perspective view of connected devices forming portions of the reverse control means.
Fig. 20 is a central section showing the principal elements of the transmission gearing in assembled relation.
Figure 21:
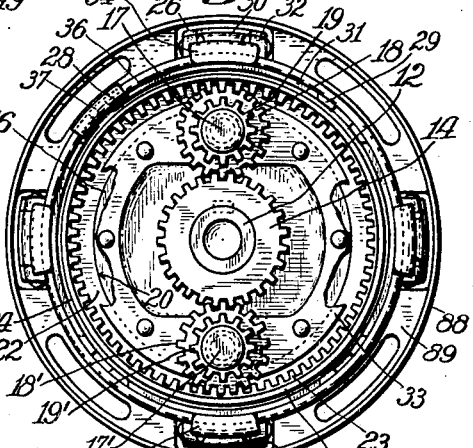
Fig. 21 is an elevation of the transmission gearing, minus the adjuster-head, as on the line XIII—XIII of Fig. 7.
Figure 22:
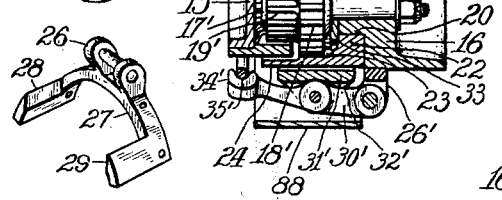
Fig. 22 is a perspective view of one of the devices of the improved gearing detached therefrom.
Figure 23:
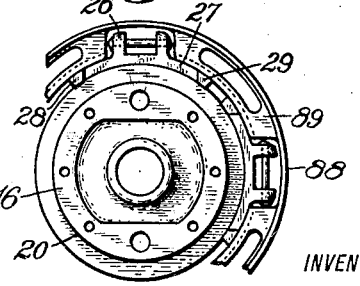
Fig. 23 is a fragmentary elevation of assembled parts reproduced from Fig. 21.

The improved gearing being especially useful in motor vehicles for simple and safe control thereof, is illustrated and described in connection with an automobile which is shown only to the extent necessary to an understanding of the application of the invention thereto, features of the automobile structure comprising side rails 1 and 2 and portions of the automobile body, an explosion engine 3 including its crank-shaft 4, which in the present case has an extension 5 provided with a flexible coupling 6, a floor 7 which has an inclined portion 8, and a seat 9.

The improved transmission gearing has a suitable gear case which comprises a lower or main part 10 and a top or cap 11 suitably secured together. The gear case is suitably secured to the frame of the vehicle and rotatably supports a driving-shaft section 12 which is connected to the flexible coupling 6 or otherwise to constitute an extension of the crank-shaft of the engine; the gear case rotatably supporting also a driven-shaft 13 in alinement with the driving-shaft 12, the driven-shaft being adapted to constitute a portion of the well-known propeller shaft of the vehicle. The gear case is adapted for retaining lubricating oil for the transmission gearing and movable appliances arranged in the gear case. The driving-shaft and the driven-shaft have suitable guiding connection each with the other. A small external driving-wheel 14 is firmly secured to the driving-shaft 12 and in proximity thereto an internal gear-wheel or driven-wheel 15 is firmly secured to the driven-shaft 13, the driven-wheel being considerably greater in diameter than the driving-wheel for gaining power in operation. An improved gear frame 16 is provided and arranged in the gear case adjacent to the driving-wheel and rotatably supported, preferably on the driving-shaft 12, the rotation of the frame being controllable. A suitable number of planetary gears for connecting the driven-wheel with the driving-wheel are mounted on the gear frame, in the present case two being illustrated, the gear frame being provided with two axles or stub-shafts 17 and 17' on which the gears are respectively mounted rotably, and for the purpose of gaining power in operation at low speeds each gear has two portions differing in diameter, so that one gear practically comprises a large gear wheel or pinion 18 and a relatively smaller wheel or pinion 19, the other comprising a large wheel or pinion 18' and a relatively smaller wheel or pinion 19'; the larger pinions or portions of the gears being in engagement with the driving-wheel 14 and the smaller pinions or portions in engagement with the driven-wheel. The wheels and gears or pinions are of the spur-tooth type, this term being intended to include also spiral-tooth gears in common use. Preferably the arrangement is such that the driving-wheel 14 is located between the driven-wheel 15 and the gear frame 16. Suitable provision is made for controlling the rotation of the connecting planetary gears or stopping rotation of the gears on their axes, and for this purpose the gear frame 16 preferably is provided with a suitable annular guide or bearing 20 on which is rotatably mounted a controlling device or gear 21 which as shown is annular in form and has a suitable bearing or guide portion 22 that is rotatably arranged on the guide or bearing 20, the device having internal gear teeth 23 so as to constitute an internal gear wheel to rotate about the axis of the driving-wheel, the arrangement described for guiding the controlling gear being preferred, and thus arranged the teeth 23 mesh with the teeth of the larger pinions or portions 18 and 18' to control the rotation of the planetary gears. The controlling gear 21 has a broad peripheral friction-contact face 24 whereby to control the controlling gear. The gear frame 16 has also a peripheral friction-contact face 25 whereby to control the gear frame. The peripheral portion of the gear frame is provided with a suitable number of hinge ears 26, 26' arranged in pairs having a common base 27 which is secured to the gear frame and has guide fingers 28 and 29 thereon that extend partially across the face 24 of the controlling gear to assist in guiding a friction-contact retarding device or shoe. A suitable number of operating and adjusting levers 30, 30' are provided and one end portion of each lever is hingedly connected to each pair of hinge ears, a friction-contact retarding device or brake shoe 31 or 31' being pivotally connected to each lever between the ends thereof, each device or shoe being provided with pivot ears 32, 32' whereby to effect the connection and enable the lever to carry and steadily guide the device or shoe. The controlling gear 21 is retained in place preferably by means of a guide plate 33 which is arranged between the gear frame and the controllable planetary gears and secured to the frame. The adjusting levers have controlled portions 34 and 34' on their opposite ends respectively, the outer face of each portion being convex, the inner side having a transverse groove 35, 35' respectively, as preferably constructed. A spring ring 36 is arranged in the grooves and adapted to yieldingly force the levers outward to hold the shoes away from the controlling gear when the machinery is at rest, centrifugal force being sufficient for the purpose when the machinery is in operation. The ring 36 is non-continuous and one end thereof has a guide sleeve 37 secured thereto that loosely receives the opposite end of the ring. For the purpose of forcing the levers inward an adjuster-head is provided which as shown comprises a sleeve 38 loosely arranged to slide or to rotate on the driven-shaft 13, a web 39 extending from the sleeve and a flange 40 extending flaringly from the web and engaging the convex end portions of the levers 30, 30', so that when the adjuster-head is moved toward the controlling gear the flange 40, acting as a hollow cone or wedge device sliding on the lever portions, graduatedly force the levers inward and consequently force the friction-contact devices or brake shoes against the face 24 to control the controlling gear. The sleeve 38 has a collar 41 thereon with which a shifting fork 42 is operatively connected so as to operate and control the adjuster-head, the fork having an arm 43 which is rigidly secured to a rock-shaft 44 suitably mounted in the gear case below the driven-shaft. The rock-shaft has a controlling arm 45 rigidly secured thereto, the arm being provided with a wrist pin 46 for operation and control thereof, to effect forward motion drive. For effecting reverse motion drive, a non-continuous band 47 is arranged about the friction-contact face 25 to coöperate therewith and preferably is provided with separate shoes 48, 48' of suitable material to withstand or resist wear to a high degree in contact with the surface 25, the separate shoes tending to dissipate heat that may be developed by sliding friction contact. The band is retained in place and operated by means of a rock-shaft 49 suitably mounted in the gear case and having arms 50 and 51 thereon that are connected with the end portions of the band, so that when the shaft is turned in one direction the band is contracted diametrically and is expanded when the shaft is turned in the opposite direction, the shaft having a controlling arm 52 rigid thereon that is provided with a wrist pin 53 for its control; so that in case the band 47 is contracted with sufficient force the gear frame 16 is practically locked stationarily to the gear case but may be permitted to rotate at different speeds when the band is graduatedly slackened or expanded. It will be observed that the rock-shaft 44 is arranged transversely and the rock-shaft 49 longitudinally in the gear case and so as to bring the controlling arms 45 and 52 in proximity each to the other.

An improved shifting-link or cam device is provided which is rigidly secured to a rock-shaft 54 and comprises a head 55 having a cam groove 56 in one side thereof receiving the wrist pin 46, and having also a convex peripheral portion 57 that is curved concentrically to the axis of rotation of the head and has a cam groove 58 therein that receives the wrist pin 53. The cam grooves 56 and 58 are so designed as to hold one of the controlling arms inactively while the other is being operated, so that the forward motion and reverse motion controlling devices are synchronously controlled. The shifting-link is in turn operated and controlled by means of a primary controlling lever, or more directly in the present case by means of an arm 59 rigidly secured to the rock-shaft 54, the rock-shaft extending through the wall of the gear case and the arm being located outside the gear case. A tumbling-shaft 60 is suitably mounted below the crank shaft extension and supported by the frame rails 1 and 2 of the vehicle so as to be forward of the gear case and parallel with respect to the rock-shaft 54, and the primary controlling lever 61 is rigidly secured to the tumbling-shaft and extends upward through the floor 7 adjacent to a toothed quadrant 62 secured to the floor. The lever rotatably supports a short shaft 63 to which is secured a small pinion 64 that is in engagement with the quadrant or rack-bar, a larger pinion or toothed gear wheel 65 being secured to the shaft and engaged by a latch 66 mounted on the lever and provided with a finger lever 67 for its control. An arm 68 is secured to the tumbling-shaft 60 and constitutes practically a separate portion of the lever 61 at a suitable distance therefrom, because of the lever being arranged adjacent to the driving-shaft or centrally in the automobile body, and the arm has an inclined slot 69 therein. A reach rod 70 is pivoted to the arm 59 and has a jaw 71 thereon which is provided with a wrist pin 72 that extends through the slot 69, so that when the wrist pin is moved upward in the slot the reach rod is moved rearward, the wrist pin normally resting in the bottom or most forward portion of the slot. Another tumbling-shaft 73 is rotatably supported also by the vehicle frame forward of the tumbling-shaft 60 and has an arm 74 rigidly secured thereto and extending rearwardly, a lifting link 75 being pivoted to the arm and connected with the wrist pin 72 for controlling the position of the jaw 71. A foot-lever 76 is secured also to the tumbling-shaft 73 and extends upward through the inclined portion 8 of the floor, a spring 77 being suitably anchored to the vehicle frame and connected with the foot-lever so as to retract the latter and cause the wrist pin 72 to be brought to and held in its normal position. Thus, when the lever 61 is moved forward to adjust the gearing for forward drive, the foot-lever may be operated to cause the propeller-shaft to be disconnected from the driving-shaft without disturbing the adjustment of the primary controlling lever, which may be convenient for the driver to permit the vehicle to slow down when approaching a bad portion of the roadway without removing his hands from the steering wheel to manipulate the primary controlling lever. Normally the lever 61 is set in mid-position when the gearing is adjusted so as to prevent the driving-shaft from actuating the driven-shaft.

For the purpose of insuring automatic application of the vehicle brake when the controlling lever 61 is in mid-position, a cam arm 78 is pivotally connected at one end to the rock-shaft 73 and has a brake rod 79 pivotally connected to its opposite end, the rod being connected with an arm 80 supported on a pivot 81 and having a brake-shoe 82 to operate on a brake-drum 83, the brake device being symbolically shown and obviously may be variously constructed and arranged. The cam arm 78 has a cam projection 84 on its rear side, and an arm 85 is rigidly secured to the tumbling-shaft 60 and provided with a roller 86 to engage the cam projection for causing the brake to be applied, the brake being released at the required times by means of a spring 87 suitably supported and connected with the brake rod 79.

In some cases a casing band 88 is provided for preventing excessive splashing or whipping of the lubricating oil in the gear casing and is arranged about the shoes 31 and 31' outside of their operating levers, the band having a supporting web 89 provided with a base flange 90 which is secured to the gear frame.

In some cases a gear wheel 91 is secured to the driving-shaft 12 within the gear case, a short shaft 92 being rotatably mounted in the wall of the gear case and having a pinion 93 secured to its inner end in mesh with the gear wheel, and a pinion 94 secured to its outer end to be suitably driven by an electrical starter, as in common practice.

In practical use, the operation and direction of motion may be controlled and the brake apparatus automatically controlled by means of the primary controller lever 61, so that the control of the movement of the vehicle, with which the invention is provided, is simplified but, under certain conditions, the trained operator may conveniently use the foot-lever 76 to cut out or disconnect the engine from the drive gearing to permit the vehicle to gradually slow down on the road. Assuming that the vehicle is at rest with the primary controller in mid-position and that the engine has been started, in order to start the vehicle forward, the lever 61 is moved forward a short distance to cause forward movement of the shifting-link 55 which, without moving the arm 52, causes the arm 45 to be moved, resulting in the brake-shoes 31 mounted on the gear frame being applied with some force to the contact surface 24 of the controlling gear 21 with the result that the controlling gear, in engagement with the planetary gears or pinions, retards the rate of rotation of the latter which previously have been freely rotating on their axes because of their connection with the rotating driving wheel 14, the gear frame 16 being compelled to rotate while the gear portions 19 run in connection with the driven-wheel 15. When the frictional resistance on the controlling gear is sufficient to overcome the resistance of the vehicle on the ground the driven-wheel 15 is compelled to rotate slowly at first and cause movement of the vehicle, after which greater pressure may be applied, to obtain higher speed, by moving the lever 61 farther forward and latching it so that the higher speed may be maintained. On movement of the lever forward with sufficient force to further retard the movement of the controlling gear 21 relatively to the gear frame until the controlling gear is practically locked to the gear frame and the relative movement of the controlling gear is stopped, the rotation of the controllable gears is stopped, with the result that the gears serve as connecting dogs between the driving-wheel 14 and the driven-wheel 15, the driven-shaft then being rotated at the speed of the driving-shaft, straight drive being thus effected. In case it is desired that the vehicle speed be reduced or stopped temporarily, the foot-lever 76 may be operated so as to release the strain more or less on the connecting rod 70 to lessen the pressure of the retarding device 31, the pressure being varied, however, by manipulation of the foot-lever so that various speeds may be maintained on differing road grades. When the foot-lever is released it is retracted by the spring 77 which causes the pin 72 to be returned to its normal position, after which the higher speed will be regained. When it is desired to stop the vehicle and prevent its movement the lever 61 is returned to its mid-position with the result that the arm 85, acting on the cam projection 84, will cause the vehicle brakes to be applied. The lever 61 may be moved slightly forward or rearward from its mid-position so as to release the brakes without causing sufficient readjustment of the transmission gearing devices to enable the engine to start the vehicle. If it be desired to start the vehicle backward, the lever 61 is moved backward with the result that, while the arm 45 is not moved by the shifting-link the latter moves the arm 52 and causes contraction of the band 47 so as to frictionally engage the contact face 25 and cause the rotating gear frame 16 to be retarded sufficiently to slowly start the vehicle backward. The speed may be increased either by moving the lever 61 farther backward or by leaving the lever in latched position and pressing on the foot-lever 76, gradual release of the foot-lever causing reduction of speed. While the brake-shoes 31 are carried and primarily guided by their operating levers the shoes are more firmly guided by the guide projections 28 and 29, so that uniform action of the shoes under pressure is insured.

Having thus described the invention, what is claimed as new is—

1. Transmission gearing including a driving-wheel, a driven-wheel, and rotatably supported toothed gears connected with the driving-wheel and the driven-wheel and provided with graduated controlling means connected with the teeth of the gears to stop rotation of the gears.

2. Transmission gearing including a driving-wheel, a driven-wheel, a rotatable gear frame, controllable gears rotatable on the frame in connection with the driving-wheel and the driven-wheel, and a controlling gear rotatably supported by the gear frame in connection with all the controllable gears.

3. Transmission gearing including a toothed driving-wheel, a toothed driven-wheel, a gear frame, a toothed controllable gear rotatable on the gear frame and engaging the driving-wheel and the driven-wheel, and a toothed controlling gear guided by the gear frame and engaging the teeth of the controllable gear.

4. Transmission gearing including a driving-wheel, a driven-wheel, a gear frame, a controllable gear rotatable on the gear frame and connected with the driving-wheel and the driven-wheel, and graduatedly-controlled means movably mounted on the gear frame for acting on the peripheral portion of the controllable gear to stop rotation of the controllable gear.

5. Transmission and controlling gearing including a driving-wheel, a driven-wheel, rotatably supported toothed gears connected with the driving-wheel and the driven-wheel, graduatedly-controllable controlling means for the gears connected with the teeth thereof to graduatedly control the rate of rotation of the gears, and means for graduatedly controlling the controlling means.

6. Transmission gearing including a driving-wheel, a driven-wheel, a rotatable gear frame, controllable gears rotatably mounted on the gear frame in engagement with the driving-wheel and the driven-wheel, a controlling gear rotatable on the gear frame and engaging the controllable gears, and means coöperating with the gear frame for controlling the rotation of the controlling gear relatively to the frame.

7. Transmission gearing including a toothed driving-wheel, a toothed driven-wheel, a rotatable gear frame, and a toothed controllable gear rotatable on the gear frame in engagement with the driving-wheel and the driven-wheel and provided with means adjustably mounted on the gear frame and adapted to coöperate with the teeth of the controllable gear to control or stop rotation of the gear.

8. Transmission gearing including a driving-wheel, a driven-wheel, a rotatable gear frame having a controllable gear and a controlling gear rotatably mounted thereon, the controllable gear having engagement with the driving-wheel and the driven-wheel and also with the controlling gear, and means adjustably mounted on the gear frame for controlling the rotation of the controlling gear relatively to the gear frame.

9. Transmission gearing including a rotatable gear frame, a driven-wheel, a driving-wheel arranged between the gear frame and the driven-wheel, a controllable gear rotatable on the gear frame in connection with the driving-wheel and the driven-wheel, a graduatedly-controllable controlling gear rotatably supported in connection with the controllable gear, and means for graduatedly controlling the controlling gear.

10. Transmission gearing including a rotary driving-wheel, a rotary driven-wheel, a rotatable gear frame, a controllable gear rotatable on the gear frame in connection with the driving-wheel and the driven-wheel, and graduatedly-controlled controlling means guided by the gear frame including an element having constant connection with the controllable gear to graduatedly retard or to stop rotation of the gear.

11. Transmission gearing including a rotary driving-wheel, a rotary driven-wheel, and a controllable gear provided with a rotatable carrier rotatably supporting the gear in coöperation with the driving-wheel and the driven-wheel, the carrier having a controllable adjustable controlling device mounted thereon for co-acting with and graduatedly retarding rotation or stopping the rotary movement of the controllable gear.

12. Transmission and controlling gearing including a driving-wheel, a driven-wheel, a rotatable gear frame, and controllable gears rotatable on the gear frame in connection with the driving-wheel and the driven-wheel and provided with a rotary controlling gear connected therewith having adjustably operable controlling means coöperating with the gear frame and partially controlled thereby to regulate the rate of rotation of the controlling gear.

13. Transmission and controlling gearing including a controllable reversing transmission gearing, two series of movable means adapted for controlling the transmission gearing and direction of motion transmitted, a primary controller connected with the two series of movable means, and a secondary controller operable independently of the primary controller and adapted to control the movable means.

14. Transmission gearing including a driving-wheel, a driven-wheel, a rotatable gear frame provided with a relatively rotatable annular controlling gear having means coöperating with and partially controlled by the gear frame for regulating or stopping the relative rotation of the controlling gear, and controllable gears rotatably mounted on the gear frame in engagement with the driving-wheel and the driven-wheel and also with the controlling gear.

15. Transmission gearing including a driving-wheel, a driven-wheel, a rotatable gear frame having a controllable gear and a controlling gear rotatably mounted thereon, the controllable gear having engagement with the driving-wheel and the driven-wheel and also with the controlling gear, graduatedly-controlled means for directly controlling the rotation of the gear frame, and means coöperating with and partially controlled graduatedly by the gear frame for graduatedly controlling the rotation of the controlling gear.

16. Transmission and controlling gearing including reversing transmission gearing, an operative primary controller, two series of movable means for controlling the gearing and direction of motion transmitted, the two series of means being connected with the primary controller for movement and control thereof, a movable secondary controller, and means enabling the secondary controller to controllably move one of the two series of movable means.

17. Transmission gearing including a driving-wheel, a driven-wheel, a rotatable gear frame having a friction-contact device adjustably mounted thereon, a controllable gear rotatable on the gear frame in connection with the driving-wheel and the driven-wheel, a controlling gear rotatable on the gear frame in connection with the controllable gear and having a friction-contact face, and means for adjusting the friction-contact device to the friction-contact face.

18. Transmission and controlling gearing including reversing transmission gearing, an operative primary controller, two series of operative means for controlling the gearing and direction of motion transmitted, the two series of means having controlling means controlled by the primary controller, and a secondary controller provided with means for controllably operating one of the two series of operative means independently of the operation of the primary controller.

19. Transmission and controlling gearing including reversing transmission gearing, an operative primary controller, two series of movable means for controlling the gearing and direction of motion transmitted, a movable shifting-link controlled by the primary controller and having sliding connection with the two series of movable means, and a movable secondary controller provided with means enabling it to coöperate with the shifting-link to controllably move one of the two series of movable means.

20. Transmission gearing including an external driving-wheel, an internal driven-wheel, a rotatable gear frame, a controlling gear rotatable on the gear frame, a controllable gear rotatable on the gear frame and having two portions differing in diameter, the larger portion of the controllable gear having connection with the driving-wheel and the controlling gear, the smaller portion of the controllable gear having connection with the driven-wheel, and graduatedly-adjustable means operable for adjustably connecting the controlling gear to the gear frame.

21. Transmission gearing including a driving-wheel, a driven-wheel, a rotatable gear frame having a controlling gear rotatably mounted thereon, the gear having a friction-contact face, a controllable gear rotatable on the gear frame and having constant connection with the controlling gear and also with the driving-wheel and the driven-wheel, a plurality of controllable levers mounted on the gear frame, contact shoes connected to the levers respectively to act on the friction-contact face of the controlling gear, and means for controlling the levers.

22. Transmission and controlling gearing including a driving-shaft, a driven-shaft, reversing transmission gearing including a train of gears constantly connected with the driving-shaft and the driven-shaft, adjustable controlling means for enabling the transmission gearing to operate to transmit motion from the driving-shaft to the driven-shaft, a primary controller and a secondary controller operable independently each of the other, and connecting means enabling the primary controller to adjust the adjustable controlling means and the secondary controller to readjust the controlling means.

23. Transmission gearing including a driving-wheel, a driven-wheel, a gear frame, and a controlling gear, all rotatable and having a common axis of rotation, controllable gears rotatable on the gear frame and having constant connection with the controlling gear and also with the driving-wheel and the driven-wheel, controlling means having coöperation with the gear frame and the controlling gear to stop rotation of the gear relatively to the frame, a controllable movable device for gradually adjusting the controlling means, a controllable movable device for controlling or stopping rotation of the gear frame, and means for synchronously controlling the movable devices.

24. In transmission gearing, the combination of a driving-shaft, a driven-shaft in alinement with the driving-shaft, an internal gear wheel secured to the driven-shaft, a gear frame rotatable on the driving-shaft, an external gear wheel secured to the driving-shaft, a controllable gear rotatable on the gear frame and engaging the external gear wheel and the internal gear wheel, a controlling gear rotatable about the axis of rotation of the gear frame and engaging the controllable gear, the controlling gear having a friction-contact face, a plurality of levers hinged to the gear frame, a plurality of shoes pivoted to the levers to be forced inwardly to said contact face, and an adjuster head movably mounted on the driven-shaft and adapted to controllably move the levers inwardly to forcibly move the shoes.

25. In transmission and controlling gearing, the combination of a driving-shaft, a driven-shaft, controllable reversing transmission gearing for connecting the driven-shaft with the driving-shaft, a supported tumbling-shaft having a cam-like shifting-link and also an operating arm thereon, two series of controlling means for the gearing having operative connection with the shifting-link, a pivoted prime controller provided with a device having an inclined slot therein, a rod pivoted to the operating arm of the tumbling-shaft and provided with a wrist-pin arranged in said slot, a pivotally supported foot-lever provided with an arm, and a lifting-link connected with the arm of the foot-lever and also with the wrist-pin, and means for stationarily holding the prime controller.

26. In transmission and controlling gearing, the combination of a driving-shaft, a driven-shaft, adjustable drive gearing for connecting the driven-shaft with the driving-shaft, a prime controller for the drive gearing movable to and fro and having a mid-position in which to disconnect the drive gearing operatively from the driven-shaft, operable connecting and controlling means adapted to enable the prime controller on movement from its mid-position to adjust the drive gearing to operatively connect the drive gearing with the driven-shaft, and a movable secondary controller for operating the connecting and controlling means to readjust the drive gearing for operatively disconnecting the gearing from the driven-shaft.

27. In transmission and controlling gearing, the combination of a driving-wheel, a driven-wheel, a rotatable gear frame, a controllable gear rotatably mounted on the gear frame and connected with the driving-wheel and the driven-wheel, a controlling gear rotatably supported and connected with the controllable gear, and a plurality of series of operable controlling means to operate respectively in coöperation with the controlling gear and the gear frame for either increasing or decreasing the rotary speed of the gear frame, with means having relatively sliding connections with the plurality of series of controlling means for separate synchronous operation thereof.

28. In transmission gearing, the combination with a rotatable driving-gear, a rotatable driven-gear, and a controllable connecting-gear, of a gear frame having an axis of rotation coinciding with the axis of rotation of the driving-gear and rotatably supporting the connecting-gear in engagement with the driving-gear and the driven-gear, the gear frame being provided with an annular guide, an annular controlling gear rotatably mounted on the guide and engaging the connecting-gear, the controlling gear having a friction-contact face, and a retarding device adjustably mounted on the gear frame to operate on the friction-contact face.

29. In transmission gearing, the combination of a driving-wheel, a driven-wheel, a rotatable gear frame, and a controllable gear rotatable on the gear frame and having two gear portions differing diametrically, the portion of greater diameter engaging the driving-wheel and the portion of lesser diameter engaging the driven-wheel, and a controlling gear supported to rotate about the axis of rotation of the gear frame and having constant engagement with the larger portion of the controllable gear, with means adjustably mounted on the gear frame for gradually controlling or stopping rotation of the controlling gear relatively to the gear frame.

30. In transmission gearing, the combination with a toothed driving-wheel, a toothed driven-wheel, a gear frame rotatably guided adjacent to the driving-wheel, and a toothed controllable gear rotatable on the gear frame in engagement with the driving-wheel and the driven-wheel, of a toothed controlling gear having an axis of rotation coinciding with the axis of rotation of the gear frame and engaging the controllable gear, and friction-contact controlling means for the controlling gear adjustably mounted on and coöperating with the gear frame to graduatedly increase rate of rotation or to stop rotation of the controlling gear relatively to the frame.

31. In transmission and controlling gearing, the combination of a driven-shaft, driving gearing to be operatively connected with the driven-shaft, operable brake apparatus having a pull-rod, a brake lever pivotally supported and pivotally connected to the pull-rod, the lever having a cam projection thereon, a prime controller for the driving gearing movable operatively to and fro and provided with an arm to engage the cam projection for operating the pull-rod on movement of the prime controller to mid-position.

32. In transmission gearing, the combination of a driving-wheel, a driven-wheel, a rotatable gear frame, a controllable gear rotatably mounted on the gear frame in connection with the driving-wheel and the driven-wheel, means adjustably coöperating graduatedly with the gear frame and including a gear having constant engagement with the controllable gear for increasing the rotary speed of the gear frame relatively to the driving-wheel, and means for decreasing the rotary speed of the gear frame relatively to the driving-wheel.

33. In transmission gearing, the combination of a driving-wheel, a driven-wheel, a rotatable gear frame, and a controllable gear rotatable on the gear frame in engagement with the driving-wheel and the driven-wheel, with a controlling gear rotatably supported on the gear frame and having constant engagement with the controllable gear, and means for gradually increasing the rate of rotation of the controlling gear on the gear frame.

34. In transmission gearing, the combination of a gear case to hold a lubricant, a driving-shaft and a driven-shaft rotatably supported by the gear case, transmission gearing including a gear frame rotatable in the gear case for connecting the driven-shaft with the driving-shaft, and a cylindrical casing secured to the gear frame and encircling the transmission gearing.

35. In transmission gearing, the combination with a driving-wheel, a driven-wheel, a rotatable gear frame, and a controllable gear rotatable on the gear frame in engagement with the driving-wheel and the driven-wheel, of a controlling gear rotatably supported and having constant connection with the controllable gear, and means for engagement with the controlling gear to control and increase its rate of rotation relatively to the gear frame.

36. In transmission gearing, the combination of a rotatable driven-wheel, a rotatable gear frame, a driving-wheel rotatably arranged between the driven-wheel and the gear frame, a controllable gear rotatable on the gear frame in engagement with the driving-wheel and the driven-wheel, and controlling means adjustably carried by the gear frame and including a controlling gear constantly engaging the controllable gear to increase and control the rate of rotation of the controlling gear.

37. In transmission gearing, the combination with a driving-shaft, a driven-wheel, a driving-wheel secured to the driving-shaft, a gear frame rotatable on the driving-shaft and having a peripheral friction-contact face, and gears rotatable on the gear frame and connected with the driving-wheel and the driven-wheel, of a non-continuous band encircling said face, a plurality of shoes secured to the inner side of the band to be brought into contact with said face, and means for diametrically contracting or expanding the band.

38. In transmission gearing, the combination with a driving-shaft, a driven-shaft, a driving-wheel secured to the driving-shaft, a gear frame rotatable on the driving-shaft, a driven-wheel secured to the driven-shaft, controllable gears rotatable on the gear frame and engaging the driving-wheel and the driven-wheel, and means for controlling the controllable gears having levers pivotally connected to the gear frame, of an adjuster head slidingly mounted on the driven-shaft and having a hollow conical flange engaging the outer sides of the ends of said levers, and an elastic ring seated in the inner sides of said levers and holding the levers to said flange.

39. In reversing transmission gearing, the combination with a driving-shaft, a driven-shaft, and transmission gearing having two series of controllable elements for connecting the driven-shaft with the driving-shaft, of two series of controlling means for the elements respectively and having two shafts arranged rotatively at right angles each to the other, two operating arms secured to the shafts respectively and having each a wrist-pin thereon, and a controlled connecting device movably supported and having two faces at right angles each to the other, one of the faces having a cam-groove therein receiving and controlling the wrist-pin of one of said arms, the remaining face having a cam-groove therein receiving and controlling the wrist-pin of the remaining one of said arms.

40. In reversing transmission gearing, the combination of a driving-shaft, a driven-shaft, reversing mechanism for operatively connecting the driven-shaft with the driving-shaft, two series of controlling devices for the mechanism to effect forward motion drive and reverse motion drive respectively, one of the series of devices including a shaft rotatively arranged transversely of the driven-shaft and having an operating arm thereon, the other of the series of devices including a shaft rotatively arranged parallel to the driven-shaft and having an operating arm thereon, and connecting means movably supported and having sliding connection with the operating arms of the two shafts and adapted to move and control the arms synchronously.

41. In transmission gearing, the combination of a driving-shaft, a driven-shaft, a driven-wheel secured to the driven-shaft, a gear frame rotatably mounted on the driving-shaft, a driving-wheel secured to the driving-shaft, controllable gears rotatable on the gear frame and engaging the driving-wheel and the driven-wheel, a controlling gear rotatable on the gear frame and engaging the controllable gears, the controlling gear having a peripheral friction-contact face, a plurality of pairs of guides rigid on the gear frame and projecting partially across said face, a plurality of shoes arranged adjacent to said face, each shoe between the guides of each pair, levers pivotally connected with the shoes respectively and hinged to the gear frame, and means for operating the levers to force the shoes to said face.

In testimony whereof, I affix my signature in presence of two witnesses.

ELLIS T. SILVIUS.

Witnesses:
O. S. WHITEMAN,
I. C. WASKOM.